United States Patent [19]

Buschbom et al.

[11] Patent Number: 4,471,868
[45] Date of Patent: Sep. 18, 1984

[54] INCLINE-DECLINE CONVEYOR

[75] Inventors: Floyd E. Buschbom, Long Lake; Glen D. Hansen, Maple Plain, both of Minn.

[73] Assignee: Veda, Inc., Long Lake, Minn.

[21] Appl. No.: 343,025

[22] Filed: Jan. 27, 1982

[51] Int. Cl.³ .................. B65G 19/28; B65G 21/06
[52] U.S. Cl. .................................. 198/735; 198/861; 403/364
[58] Field of Search ............... 198/735, 860, 861, 862, 198/525, 583, 584, 836; 403/364; 211/182

[56] References Cited

U.S. PATENT DOCUMENTS

| 1,860,519 | 5/1932 | Wickersham | 198/836 |
|---|---|---|---|
| 2,760,622 | 8/1956 | Magee | 198/735 |
| 3,319,774 | 5/1967 | Christensen | 198/861 |
| 3,478,865 | 11/1969 | Vogel | 198/860 |
| 3,556,306 | 1/1971 | Shell | 211/182 |
| 3,590,983 | 7/1971 | Oury | 198/860 |
| 3,796,296 | 3/1974 | Bakker | 198/861 |
| 3,802,584 | 4/1974 | Sackett, Sr. et al. | 198/538 |
| 3,828,919 | 8/1974 | Holtsclaw et al. | 198/735 |
| 4,051,948 | 10/1977 | Sackett, Sr. | 198/735 |
| 4,387,799 | 6/1983 | Sweeney et al. | 198/861 |

Primary Examiner—Joseph E. Valenza
Assistant Examiner—Daniel R. Alexander
Attorney, Agent, or Firm—Burd, Bartz & Gutenkauf

[57] ABSTRACT

A material conveying apparatus having a trough assembly for receiving material connected to a tail section. The tail section has a door movable to an open position to facilitate the cleaning of the tail section. An incline section connects the trough section to an elevator section. The incline section has conveyor guide strips that guide a movable conveyor in an arcuate path to the elevator section. The elevator section is connected to a decline assembly having a wear strip for guiding and supporting the movable conveyor. A discharge section is connected to the decline section. The drive for the movable conveyor is mounted on the discharge section.

56 Claims, 26 Drawing Figures

INCLINE-DECLINE CONVEYOR

SUMMARY OF INVENTION

The invention is directed to a material conveying apparatus having a trough assembly for receiving material to be conveyed. The trough assembly is connected to an incline assembly. An elevator section joins the incline assembly with a decline assembly. A material discharge assembly supported in an elevated position is connected to the incline assembly for discharging material to a selected location. The conveyor apparatus has a movable endless conveyor, such as an endless chain and paddle conveyor extended from the trough assembly to the discharge assembly that is driven by a drive assembly mounted on the discharge assembly.

A tail assembly is connected to the trough assembly. The tail assembly has a rotatable means cooperating with the endless conveyor. The tail assembly has a material clean-out door that is movable to an open position providing a large access opening into the interior of the tail assembly to facilitate removal of any material that may accumulate therein. A flexible baffle secured to the door is used to minimize the backflow of material into the tail assembly.

The assemblies of the conveyor are interconnected with each other with interlocking tab connections. The assemblies have generally U-shaped housings having ends provided with outwardly offset and laterally spaced tabs. Plates located over the tabs are secured to adjacent assemblies to reinforce the connections. The tabs on adjacent housings are in registration with the spaces between the tabs to allow interlocking location or interweaving of the tabs. The adjacent housings have smooth interior and coextensive surfaces, as the tabs are located adjacent the outside surface of the housings. The interlocking tab connections provide self aligning of adjacent assemblies and a straight or longitudinally aligned conveying apparatus. The inside surfaces of the side walls and bottom wall are coextensive or longitudinally aligned providing for smooth conveyor movement. Also, the smooth interior surfaces prevent material from leaking from the housing or being caught on the conveyor housing. The interlocking tab connections further allow the assemblies to be connected together with a minimum number of nut and bolt assemblies with a minimum amount of time and labor. Each assembly has a generally U-shaped housing having upwardly diverging side walls. The diverging side walls allow nesting of a plurality of housing thereby facilitating shipping and storage of a large pile of housings.

The incline assembly has a plurality of plates forming the opposite side walls that are pivotally joined to an arcuate floor. The side plates allow the incline assembly to be adjusted to an arcuate or elbow shape. Convex curved guide means mounted on the plates provide guides for the movable conveyor. The guide means comprise a pair of longitudinal strips engageable with the top of the conveyor.

The decline assembly has a convex floor supporting a linear convex curved chain guide strip. The guide strip provides a longitudinal rail for supporting the chain of the conveyor as it moves over the convex shaped floor.

The discharge assembly has a bottom material discharge opening for directing material to a desired location. The discharge assembly supports the drive means for the endless conveyor. Side plates mounted on the discharge assembly carry a transverse shaft secured to the drive sprocket for the endless conveyor. Adjusting means are operable to adjust the longitudinal position of the side plates and thereby adjust the tension on the conveyor. Motor mount structure is connected to the side plates. A power transmitting means drivably connects the motor with the drive shaft whereby on operation of the motor the endless conveyor is moved. The motor mount structure can be alternatively located in upward or downward directions whereby the motor can be located above or below the discharge assembly.

A bottom drop assembly can be added to the conveying apparatus adjacent the decline assembly and the discharge assembly. The bottom drop assembly has two longitudinally sliding door means which normally cover discharge openings. When the door means are in open positions, the endless conveyor discharges the material through the openings to a desired location. The bottom drop assembly has a chain guide including bump means operable to provide the endless conveyor with up and down motions to facilitate the movement of the material from the conveuor through the openings. The door means are movable to closed positions whereby the endless conveyor means moves material to the end discharge opening in the discharge assembly.

An object of the invention is to provide a conveyor apparatus for moving materials, such as grains, seeds, feeds, and the like, with an inclined assembly having guide means for an endless conveyor to facilitate the movement of the material in an elongated path and to an elevated location. A further object of the invention is to provide a conveyor apparatus with a tail section having a large clean-out opening that is normally closed with a door. A further object of the invention is to provide a conveyor apparatus with conveyor housings that are interconnected with each other with interweaving tabs that provide interlocking connections between adjacent housings that automatically align the housings with each other. Yet another object of the invention is to provide conveyor housings with interlocking tab connections and smooth coextensive inside surfaces which prevent material from being caught on the housings or leaking from the housings. Another object of the invention is to provide a conveyor apparatus with a bottom drop assembly having door means that are movable between open and closed positions to allow material to move through the drop assembly to a desired location. A further object of the invention is to provide a conveyor apparatus with drive means having an adjustable motor mount that can be located either above or below the discharge assembly. These and other objects and advantages of the invention are embodied in the conveyor apparatus shown in the drawings and described in the Specification.

DESCRIPTION OF PREFERRED EMBODIMENT

Figure 1:
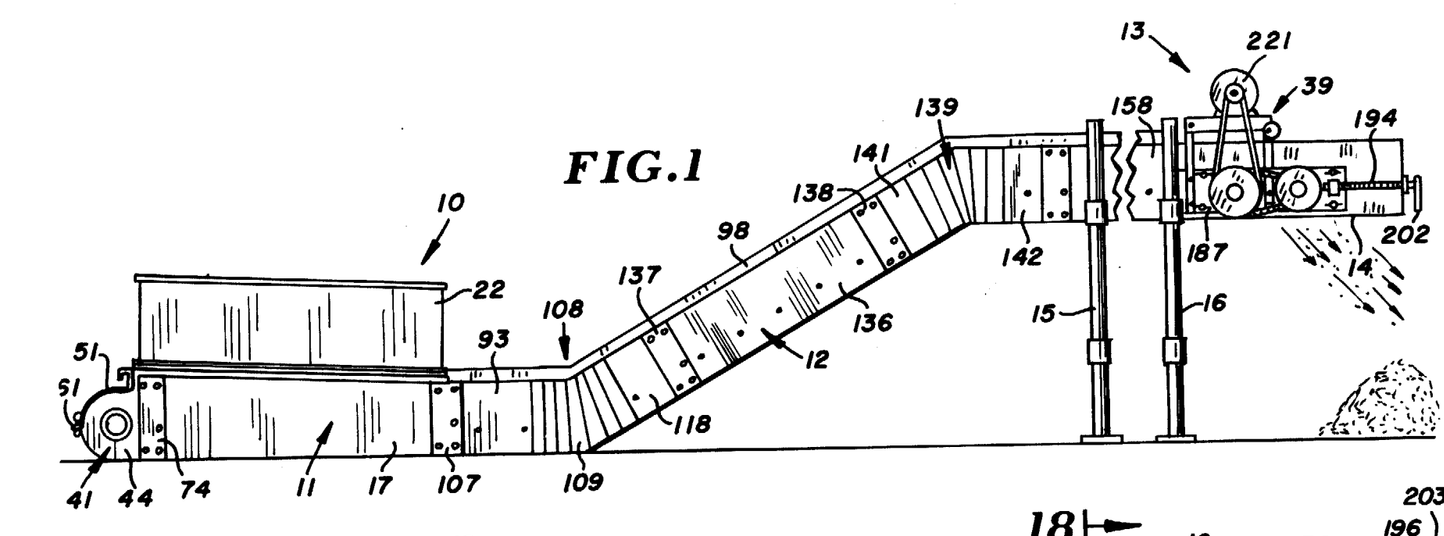
FIG. 1 is a side elevational view of the material conveying apparatus of the invention.
Figure 2:
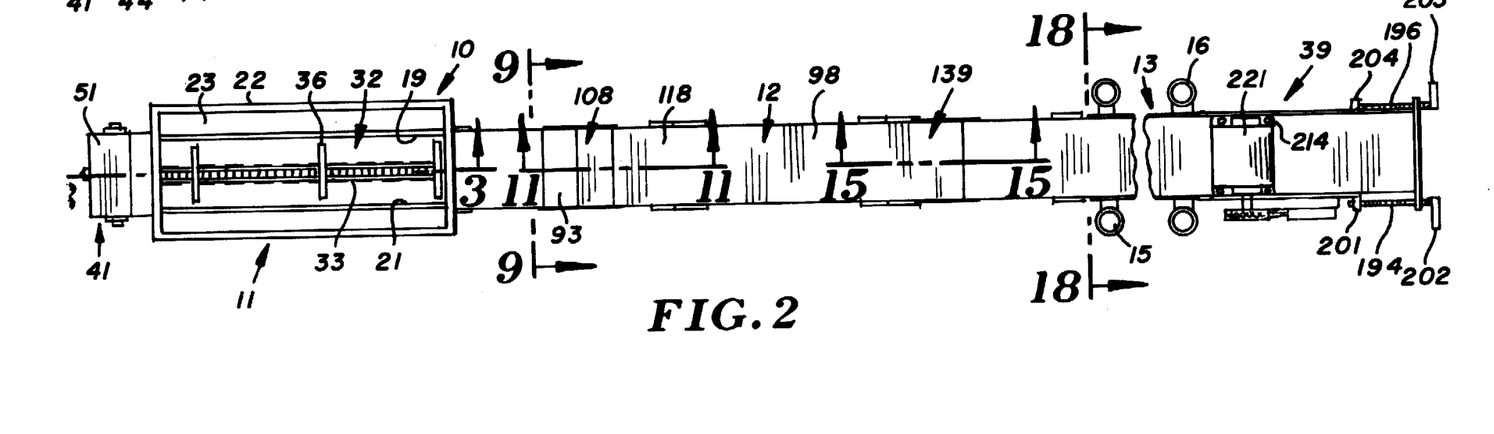
FIG. 2 is a top view of FIG. 1.

Referring to FIGS. 1 and 2, there is shown the material conveying apparatus of the invention indicated generally at 10 operable for moving bulk material, such as grains, roughages, feeds, and the like from a first location to a second remote location. Conveying apparatus 10 has a loading section or trough assembly 11 operatively associated with an incline assembly 108, an elevator section 12, a decline assembly 139, and a discharge assembly 13. Discharge assembly 13 is supported above the ground with a pair of stands 15 and 16. A vehicle, such as a bulk material mixer and feeder machine, as shown in U.S. Pat. No. 3,995,836, can be located below discharge assembly 13 for receiving material therefrom. The material can be discharged from discharge assembly 13 into a conveyor or animal feeder.

Figure 3:
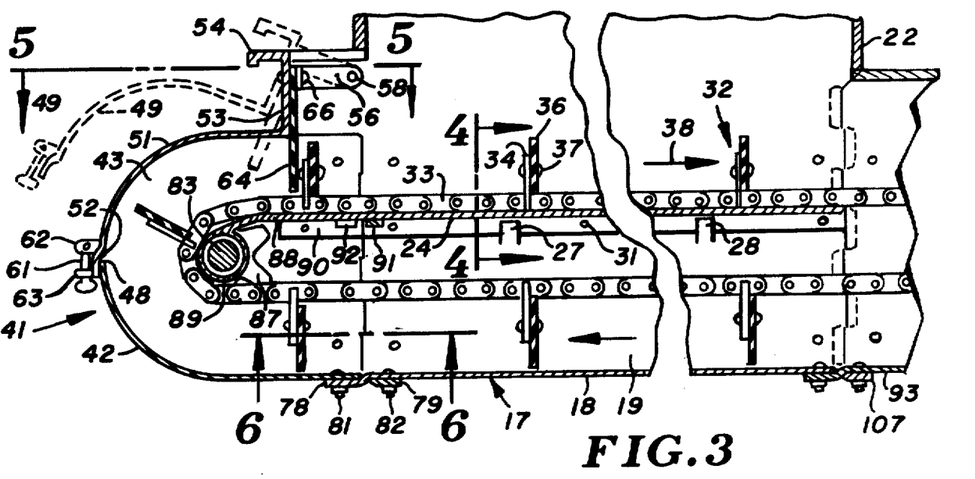
FIG. 3 is an enlarged foreshortened sectional view taken along the line 3—3 of FIG. 2.
Figure 4:
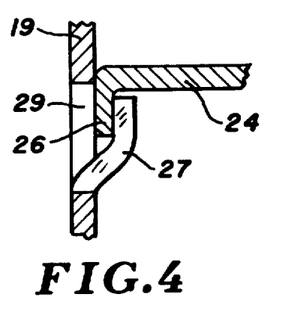
FIG. 4 is an enlarged sectional view taken along the line 4—4 of FIG. 3.

Trough assembly 11 has a generally U-shaped housing 17. Housing 17 is a sheet metal unit having a generally flat bottom wall 18 and upright side walls 19 and 21. Side walls 19 and 21 taper outwardly or diverge upwardly to permit nesting of a number of housings during storage and shipment. A rectangular hopper 22 is mounted on the top of side walls 19 and 21. Hopper 22 has an open top 23. As shown in FIG. 3, a horizontal floor 24 is located between side walls 19 and 21. Floor 24 has longitudinal downwardly directed side flanges 26. The flanges 26 hook over offset ears or tabs 27 and 28 in the side wall 19. As shown in FIG. 4, ear 27 is laterally offset with respect to the inside of side wall 19. The upper edge of ear 27 engages the bottom of floor 24 and thereby provides a support for floor 24. Ear 27 is pressed out of the side wall 19 and consists of the metal that formerly occupied hole 29. Side wall 21 has offset ears similar to ears 27 and 28, which engage the opposite flange of floor 24. Nut and bolt assembly 31 secures flange 26 to side wall 19.

An endless conveyor indicated generally at 32 is movably supported on floor 24. As shown in FIG. 3, conveyor 32 comprises an elongated endless roller link chain 33. A plurality of longitudinally cross bars 34 are secured to longitudinally spaced links of chain 33. Generally rectangular transverse paddles 36 are secured with nut and bolt assemblies 37 to cross bars 34. Paddles 36 are generally flat flexible members having upright opposite ends and a generally transverse top edge. Conveyor 32 is moved in the direction of the arrow 38 by a drive assembly indicated generally at 39.

Figure 5:
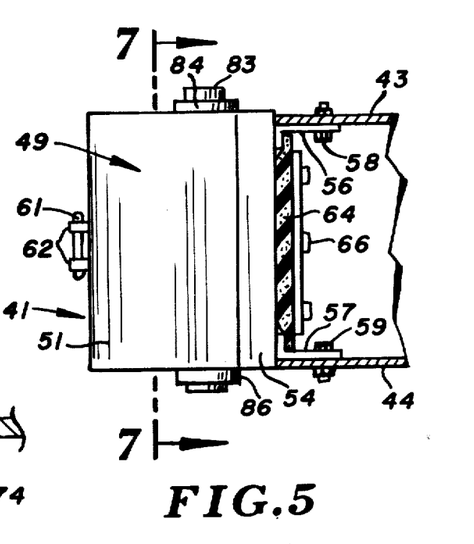
FIG. 5 is a sectional view taken along the line 5—5 of FIG. 3.

Referring to FIGS. 3 and 5, a tail assembly indicated generally at 41 is secured to housing 17. Tail assembly 41 has an upwardly curved bottom wall 42 and upright side walls 43 and 44 secured to opposite sides of bottom wall 42. Side walls 43 and 44 have outwardly directed arcuately curved flanges 46 and 47. Bottom wall 42 has a transverse top edge 48 located midway between the top and bottom of the tail assembly. The upper half of the tail assembly 41 has a large clean-out opening. The clean-out opening extends upwardly from the transverse edge 48 of bottom wall 42 and laterally between side walls 43 and 44. The opening is normally closed with a door indicated generally at 49. Door 49 comprises an arcuately curved body 51 having a transverse bottom edge 52. When door 49 is in the closed position, edge 52 engages the bottom wall of edge 48. A transverse generally upright head plate 53 is secured to the forward end of body 51. The upper end of plate 53 has a rearwardly directed lip 54.

As shown in FIG. 5, a pair of forwardly directed arms 56 and 57 are secured to opposite sides of plate 53. Pivot bolts 58 and 59 pivotally mount arms 56 and 57 on the upper portions of side walls 43 and 44. Door 49 is held in its closed position with a releasable latch or holder 61. Holder 61 is connected to the lower portion of body 51 with a mount 62. A tab 63 on bottom wall 42 cooperates with the holder to retain the door 49 in the closed position. Holder 61 can be an elastic member having an enlarged hand gripping head. Other types of latches, such as an over-center toggle latch, can be used to hold door 49 in the closed position. When the holder 61 is released, door 49 can be pivoted about the pivot bolts 58 and 59 to the open position. The upper half of tail assembly 41 is open, thereby facilitating the removal of any material that may have accumulated in the interior chamber of tail assembly 41.

The transverse flexible baffle 64 is located adjacent the inside of plate 53. Baffle 64 extends downwardly from plate 53 toward chain 33. Nut and bolt assemblies 66 secure baffle 64 to plate 53. Baffle 64 is a generally rectangular sheet of flexible material that blocks the reverse flow of material from hopper 22 into tail assembly 41.

Figure 6:
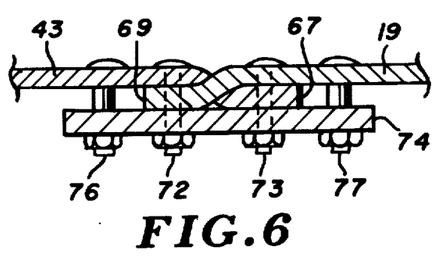
FIG. 6 is an enlarged sectional view taken along the line 6—6 of FIG. 3.
Figure 7:
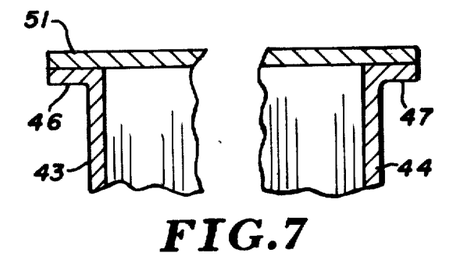
FIG. 7 is an enlarged foreshortened sectional view taken along the line 7—7 of FIG. 5.
Figure 8:
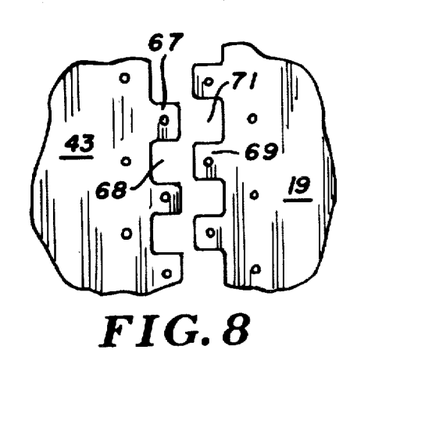
FIG. 8 is a fragmentary side view of the tab interlock connection between the tail assembly and trough assembly.

The side walls 43 and 44 and bottom wall 42 of tail assembly 41 are connected to the side walls 19 and 21 and bottom wall 18 of housing 17 with a tab interlock connection. Referring to FIGS. 6 and 8, side wall 43 has outwardly offset tabs 67. Adjacent tabs 67 are separated with space 68. Side wall 19 of housing 17 has outwardly offset tabs 69. Adjacent tabs 69 are spaced, as shown at 71, from each other. The space 68 is aligned with tabs 69 and space 71 is aligned with the tabs 67. When the tail assembly 41 and housing 17 are joined together, tabs 67 and 69 interlock or interweave with each other, as shown in FIG. 6. Nut and bolt assemblies 72 and 73 secure the tabs to the adjacent wall. The nut and bolt assemblies 72 and 73 extend through a reinforcing plate 74 and clamp the plate to tabs 67 and 69. Additional nut and bolt assemblies 76 and 77 attach plate 74 to the side walls 43 and 19.

The bottom wall 42 of tail assembly 41 has a plurality of tabs 79 interlocked with a plurality of tabs 78 on bottom wall 18. Nut and bolt assemblies 81 secure tabs 78 to bottom wall 42. Nut and bolt assemblies 82 secure tabs 79 to the bottom wall 18.

The interlocking tabs 67, 68 and 78, 79 cooperate with portions of the adjacent assemblies to self align the side walls and bottom walls of adjacent housings of the assemblies. This alignment results in a straight conveyor without further adjustment of the conveyor parts or conveyor stands. These interlocking tab connections also locate the inside surfaces of the side walls and bottom walls in longitudinal alignment with each other so that material does not get caught in the connections nor leak from the housings. The assembly of the interlocking tab connections is relatively simple and is accomplished by longitudinally moving adjacent housings together and securing the tabs to the adjacent housings. This is done with a minimum number of nut and bolt assemblies.

Tail assembly 41 has a transverse central shaft 83 supported by bearings 84 and 86 on side walls 43 and 44. A sprocket 87 attached to the center of shaft 83 accommodates link chain 33. The upper run of the link chain 33 is moved on a floor 88 having a sleeve or roll 89 surrounding shaft 83 adjacent opposite sides of sprocket 87. Interlocking tabs 91 and 92 couple floor 88 with floor 24. Floor 88 has side flanges 90 attached to side walls 43 and 44.

Figure 9:
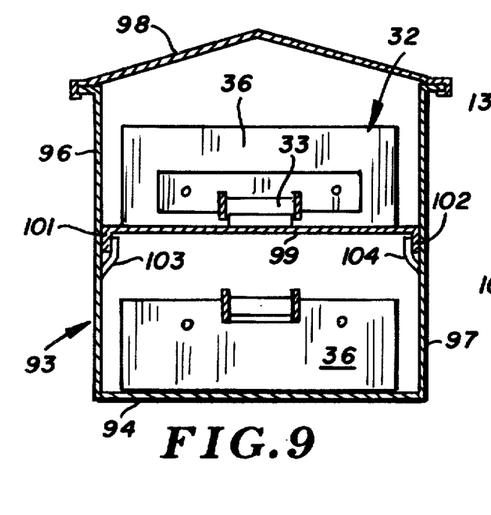
FIG. 9 is an enlarged sectional view taken along the line 9—9 of FIG. 2.

As shown in FIGS. 2 and 9, an incline assembly 108 having a housing section indicated generally at 93 is attached to trough assembly 11. Housing section 93 has a generally flat bottom wall 94 and upwardly and outwardly tapering side walls 96 and 97. The tapering side walls 96 and 97 allow the housing section 93 to be nested for storage and shipment. A cover 98 is mounted on the top of the side walls 96 and 97. A floor 99 extends between the mid-sections of side walls 96 and 97. Floor 99 has downwardly directed longitudinal flanges 101 and 102. The flanges cooperate with inwardly offset ears 103 and 104 projected from the side walls 96 and 97. Nut and bolt assemblies 106 secure the flanges 101 and 102 to their side walls 96 and 97.

As shown in FIG. 1, an interlocked tab connection indicated generally at 107 connects housing 93 to the trough assembly 11. Connection 107 is identical in structure to the interlocked tab connection, as shown in FIGS. 6 and 8.

Figures 10, 13, 16, 17:
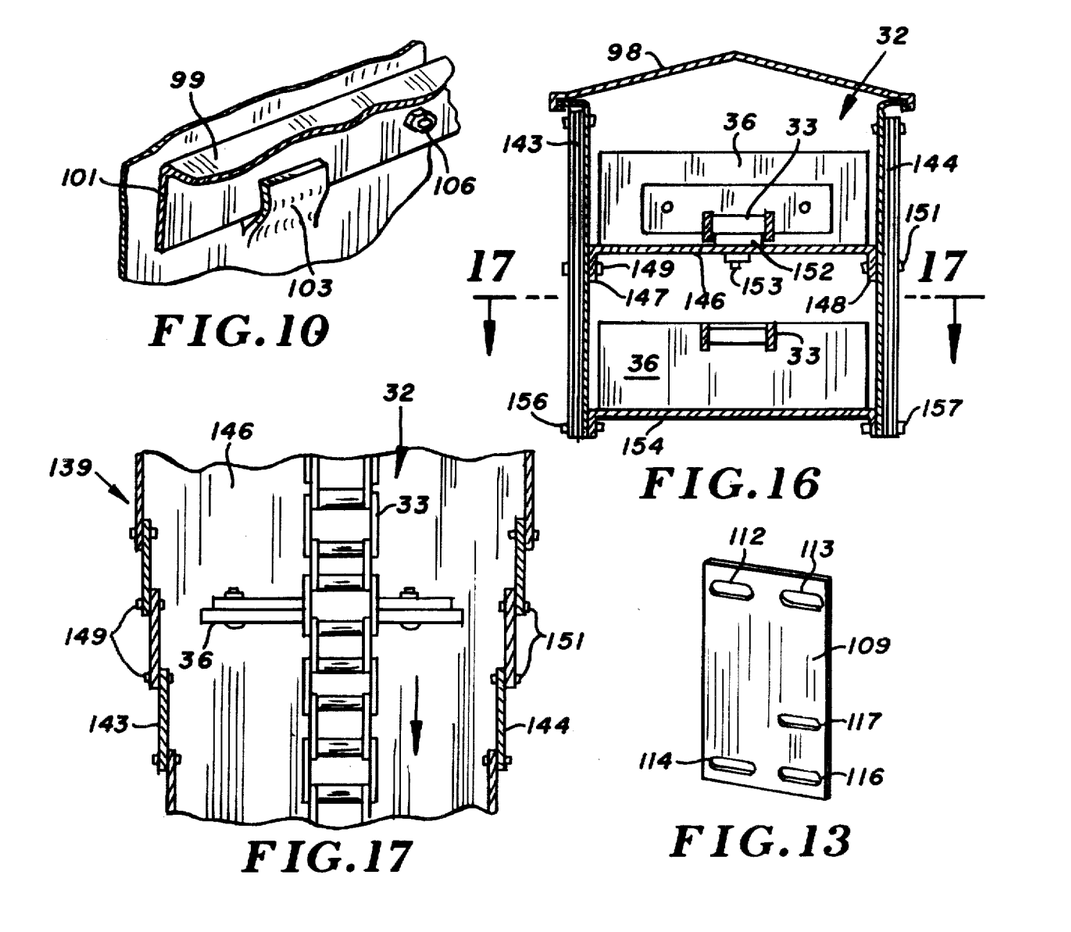
FIG. 10 is a perspective view of an ear floor support of FIG. 9.
FIG. 13 is an enlarged perspective view of a side plate.
FIG. 16 is an enlarged sectional view taken along the line 16—16 of FIG. 15.
FIG. 17 is a sectional view taken along the line 17—17 of FIG. 16.

An inclined assembly 108 has a plurality of lapping side plates 109 and 111 connected to housing section 93 and a second housing section 118. Housing section 118 is identical in structure to housing section 93. As shown in FIG. 13, plate 109 is a generally flat plate having a pair of top slots 112 and 113 and a pair of bottom slots 114 and 116. The mid-section of plate 109 has a central slot 117.

Figure 14:
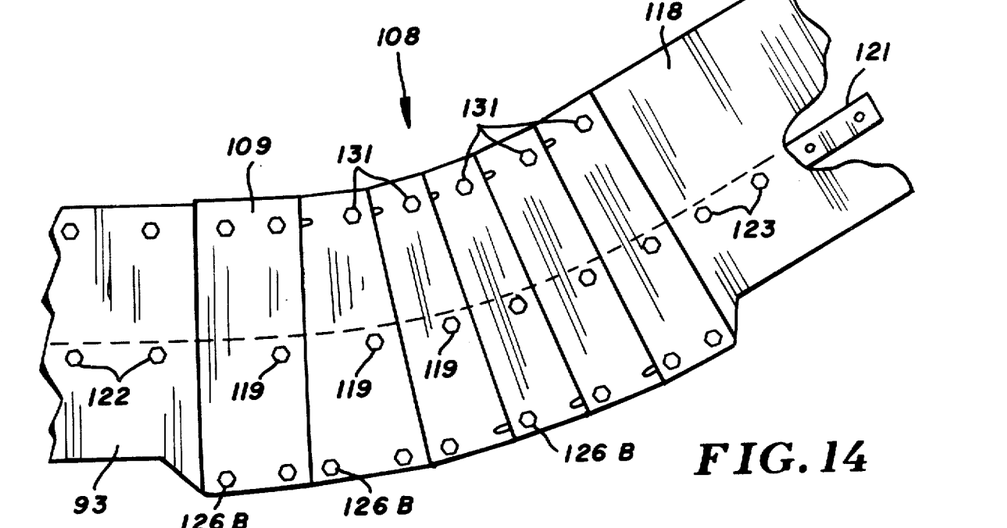
FIG. 14 is an enlarged side view of the incline assembly of the conveyor of FIG. 1.

As shown in FIG. 14, adjacent edges of a plurality of plates 109 overlap and are secured with nut and bolt assemblies 119A and 119B to opposite sides of the curved floor 121. Floor 121 has a first end portion extended between the side walls 96 and 97 of first housing section 93 and secured thereto with nut and bolt assemblies 122. Floor 121 has a second end section located between the side walls of the second housing section 118. Nut and bolt assemblies 123 secure the second end section of the floor 121 to housing side walls 118. A curved bottom wall 124 is located between the lower ends of the plates 109 and 111. Nut and bolt assemblies 126A and 126B secure opposite sides of the bottom wall 124 to the lapped plates 109 and 111.

Figure 11:
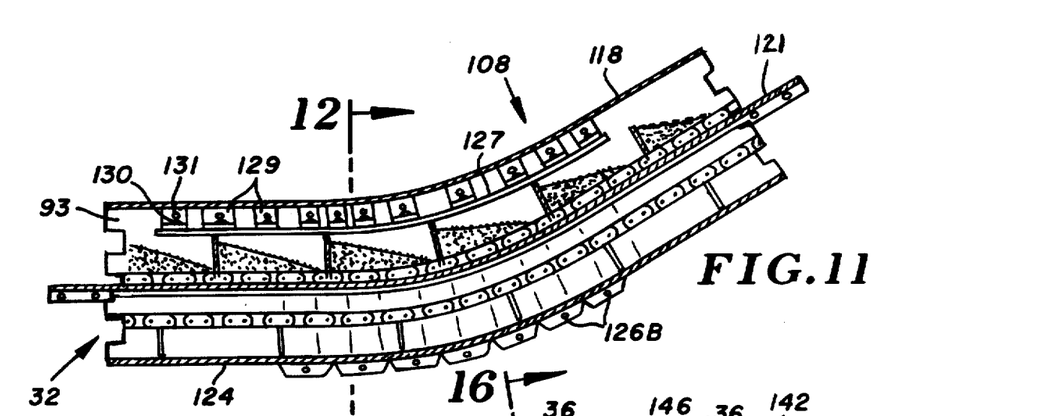
FIG. 11 is an enlarged sectional view taken along the line 11—11 of FIG. 2.
Figure 12:
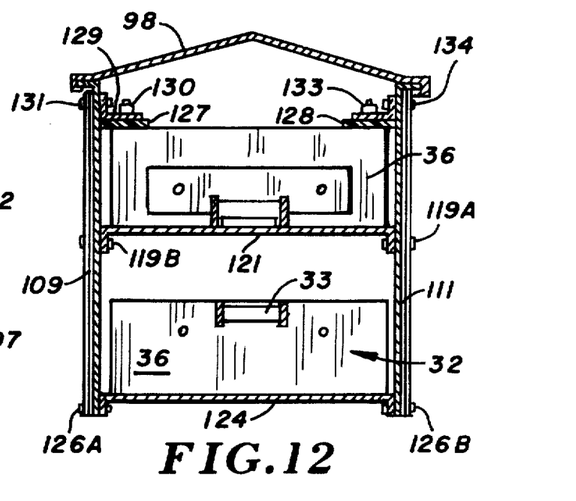
FIG. 12 is a enlarged sectional view taken along the line 12—12 of FIG. 11.

As shown in FIG. 12, a pair of convex curved guide members 127 and 128 are located in engagement with the upper edge of paddle 136 to hold the paddle 36 and chain 33 close to floor 121 so that the paddle 136 moves material along the floor 121. The guide members are elongated longitudinal strips 127 and 128. Each strip has a general concave curvature, as shown in FIG. 11, that extends from housing section 93 into housing section 118. A plurality of first L-shaped brackets 129 adjustably mount the guide strip 127 on housing sections 93 and 118 and plates 109. Nut and bolt assemblies 130 secure the strip 127 to brackets 129. Nut and bolt assemblies 131 secure the brackets to the plates 109. A plurality of second L-shaped brackets 132 secure guide strip 128 to housing sections 93 and 118 and lapped plates 111. Nut and bolt assemblies 133 connect strip 128 to brackets 132. Nut and bolt assemblies 134 connect the brackets to the lapped plates 111.

Incline assembly 108 is connected to elevator section 12 with an interlock tab connection 137. The upper end of elevator section 12 is connected with an interlock tab connection 138 to a decline assembly indicated generally at 139. Interlock tab connections 137 and 138 are identical in construction to interlock tab connection shown in FIGS. 3, 6, and 8.

Figure 15:
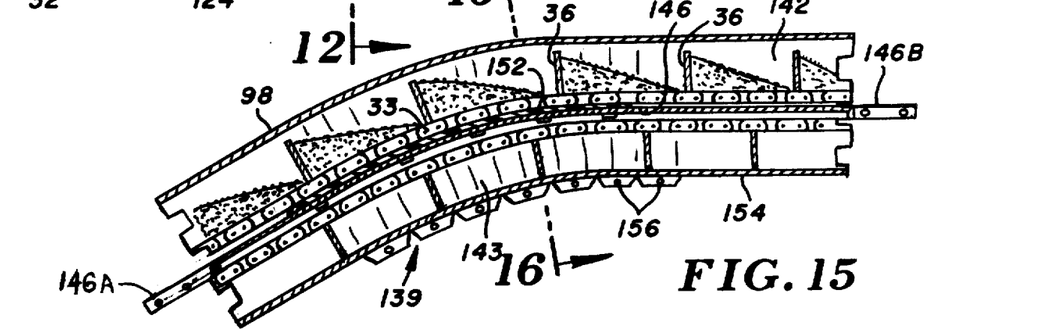
FIG. 15 is an enlarged sectional view taken along the line 15—15 of FIG. 2.

Decline assembly 139, as shown in FIGS. 15, 16, and 17, has a first housing section 141, a second housing section 142, and a plurality of side plates 143 and 144 connecting the housing sections 141 and 142. The plates 143 and 144 are identical in construction to plate 109, as shown in FIG. 13. A floor 146 is located between the side walls of the housing sections 141 and 142 and lapped side plates 143 and 144. As shown in FIG. 16, floor 146 has downwardly directed linear side flanges 147 and 148. Nut and bolt assemblies 149 and 151 pivotally connect side plates 143 and 144 to flanges 146 and 147. The side plates 143 and 144 are angularly located relative to each other to position the second housing section 142 in a generally horizontal location. The floor 146 has a first end section 146A that extends into and is secured to the side walls of housing 136. The opposite end of floor 146 has an end section 146B that extends into a discharge section 13. A chain guide comprising an elongated convex curved strip 152 is located longitudinally along the center of the top of floor 146. A plurality of nut and bolt assemblies 153 secure strip 152 to floor 146. As shown in FIG. 15, strip 152 extends along the arcuate portion of the floor 146 and functions as a longitudinal wear member and guide for the chain. The strip 152 minimizes the wear and pressure of the chain 33 and paddles 36 on the convex curved section of floor 146. Bottom wall 154 is attached with nut and bolt assemblies to the plates 143 and 144. The bottom run of the conveyor 32 rides on the top of bottom wall 154.

Figure 18:
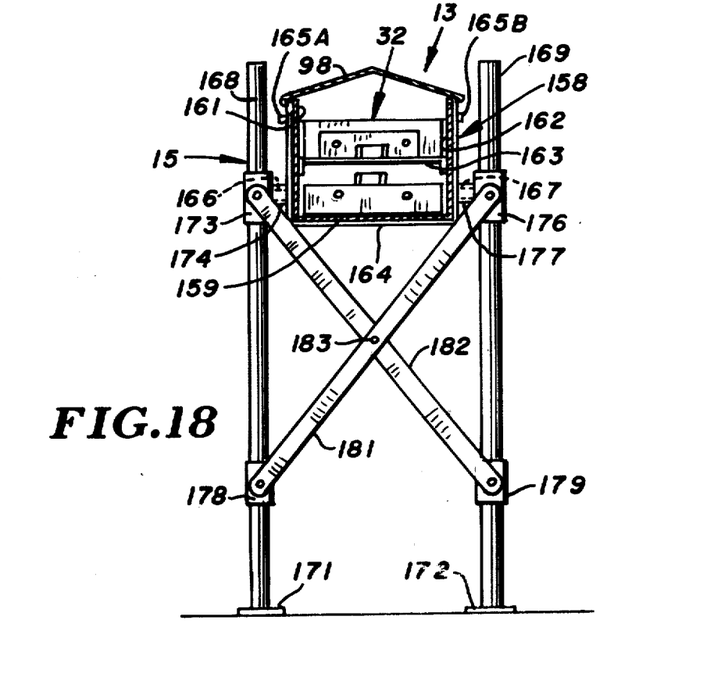
FIG. 18 is an enlarged sectional view taken along the line 18—18 of FIG. 2.

Discharge assembly 13, as shown in FIG. 18, has a U-shaped housing 158 comprising a generally horizontal bottom wall 159 and upright outwardly tapered side walls 161 and 162. A horizontal floor 163 extends between intermediate portions of side walls 161 and 162. The floor 163 is connected to the side walls 161 and 162 with the tabs and nut and bolt assemblies, such as shown in FIG. 10. The endless conveyor 32 rides on top of floor 163 to move the material to a bottom discharge opening. The return or bottom portion of conveyor 32 rides on the bottom wall 159.

Stand 15 comprises a generally U-shaped member or yoke 164 located adjacent the bottom wall 159 and side walls 161 and 162 of housing 158. Nut and bolt assemblies 165A and 165B secure the opposite upper portions of yoke 164 to the side walls 161 and 162. Yoke 164 has outwardly directed cylindrical projections 166 and 167 directed toward a pair of upright legs 168 and 169. Generally flat members or feet 171 and 172 are secured to the lower ends of legs 168 and 169, respectively. A collar 173 having an outwardly directed sleeve 174 is slidably mounted on leg 168. Sleeve 174 fits into the cylindrical projection 166 to pivotally connect the collar to yoke 164. A collar 176 is slidably mounted on leg 169 and has an inwardly directed collar 176. The collar 176 telescopes over the sleeve 177 to pivotally mount yoke 164 on leg 169. The cylindrical projections 166 and 167 are rotatably mounted in sleeves 174 and 177 to permit the housing 158 to be pivoted about a generally transverse horizontal axis. This allows housing 158 to be moved from its generally horizontal position to an inclined up or down position. Lower collars 178 and 179 are located about the lower portions of legs 168 and 169. Cross links 181 and 182 extend between collars 173, 179, 178, and 176, respectively. The cross portions of the links 181 and 182 are connected together with a bolt 183. Fastening means, such as set screws, can be used to secure the collars 173, 176, 178, and 179 to the legs 168 and 169 thereby holding the housing 158 in an adjusted elevated position. The leg 16 has the identical structure of leg 15.

Figure 19:
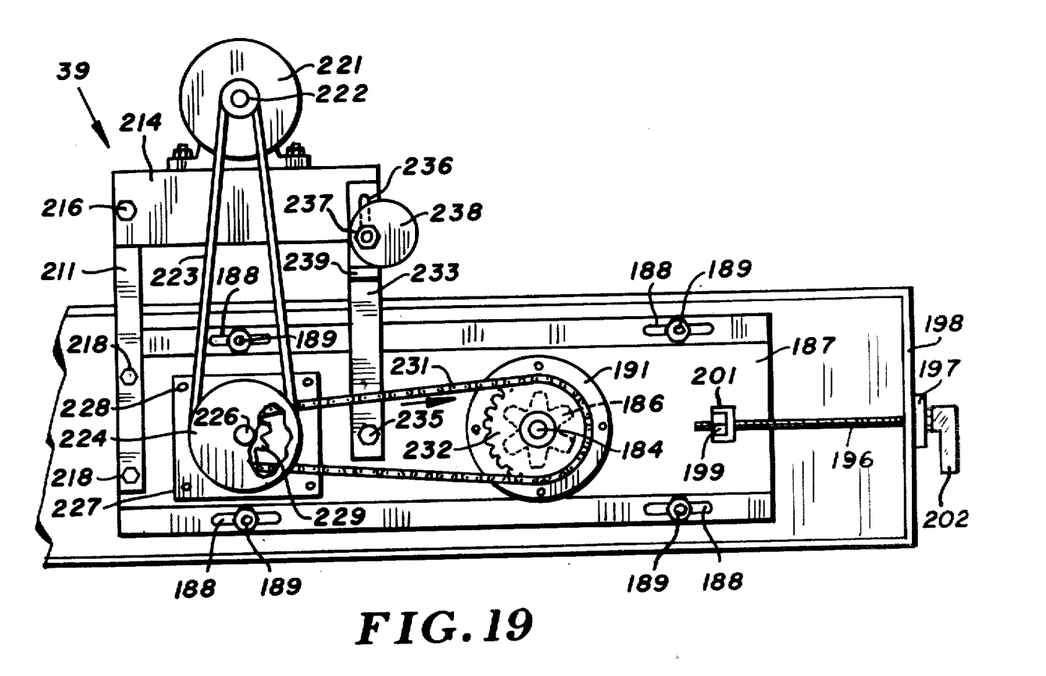
FIG. 19 is an enlarged side elevational view of the conveyor drive assembly.
Figure 20:
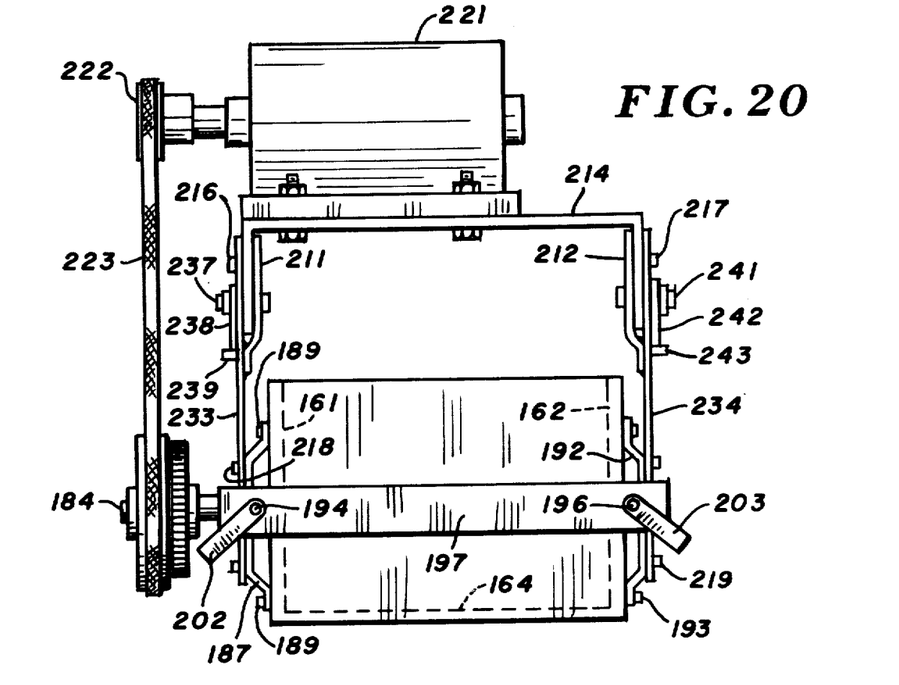
FIG. 20 is a rear elevational view of the discharge assembly.

The discharge assembly 13 has a transverse drive shaft 184 drivably secured to a drive sprocket 186. Link chain 33 is located in driving engagement with the drive sprocket 186, whereby on rotation of the sprocket 186 the endless conveyor 32 moves relative to floor 262 and bottom wall 264. As shown in FIG. 20, a first side plate 187 is located adjacent the outside of housing side wall 161. The side plate 187 has a plurality of longitudinal slots 188 accommodating nut and bolt assemblies 189 that secure the side plate 187 to side wall 161. The elongated slots 188 allow the side plate 187 to be longitudinally adjusted on housing 158. A bearing 191 rotatably mounts shaft 184 on the center of plate 187. A second side plate 192 is located adjacent the outside of side wall 162. A plurality of nut and bolt assemblies 193 extend through elongated longitudinal slots in the side plate 192 to adjustably locate the side plate relative to side wall 162. A bearing (not shown) rotatably mounts shaft 184 on side plate 192. The side plates 187 and 192 are operably connected to adjusting threaded rods 194 and 196. Rods 194 and 196 extend through holes in cross bar 197 located adjacent an end plate 198 forming the end of housing 158. As shown in FIG. 19, threaded rod 194 is threaded through a nut 199 retained in a generally U-shaped bracket 201. Bracket 201 is secured by welds or the like to the side of side plate 187. A handle 202 is secured to the outer end of rod 194. Handle 202 engages plate 197 so that on rotation of rod 194 with the handle 202 rod 194 will be threaded through nut 199 and thereby adjust the longitudinal position of side plate 187. Rod 196 is secured to a handle 203, which engages cross bar 197. Rod 196 extends through a nut (not shown) located in a bracket 204 secured to side plate 192.

Upright supports 211 and 212 are pivotally connected to a transverse generally U-shaped platform 214 with pivot bolts 216 and 217 As shown in FIGS. 19 and 20, nut and bolt assemblies 218 and 219 secure the lower ends of the supports 211 and 212 to side plates 187 and 192. A motor, shown as an electric motor 221, is mounted on top of platform 214. Motor 221 has a drive pulley 222 operatively associated with an endless belt 223. Belt 223 is trained about a large driven pulley 224 secured to a stub shaft 226. Shaft 226 is rotatably mounted with suitable bearings in a plate 227. Plate 227 is mounted on the side of side plate 187 with a plurality of nut and bolt assemblies 228. As shown in FIG. 19, a sprocket 229 is mounted on shaft 226. An endless link chain connects sprocket 229 with a large sprocket 232 mounted on shaft 184. On operation of the motor 212, the belt 223 transmits power to stub shaft 226, which, in turn, transmits power via the endless chain 231 to shaft 184, thereby driving drive sprocket 186. This causes the endless conveyor 32 to move in the elongated path established by the floors and housing means of the conveyor.

The angle of the platform 214 is adjusted to place the belt 223 under operating tension. A pair of upright posts 233 and 234 are located adjacent the rear portion of platform 214. Each post has an upright upper slot 236. As shown in FIG. 19, a bolt 237 extends through slot 236 and is attached to the side of platform 214. A disc 238 having an off-center hole accommodating bolt 237 engages a shoulder 239 fixed to post 233. As shown in FIG. 20, a disc 242 accommodates bolt 241 that connects post 234 to platform 214. Disc 242 engages shoulder 243 projected outwardly from and secured to post 234. Disc 238 and 242 function as holding members which retain platform 214 in an adjusted angular position to maintain the proper operating tension on belt 223.

Motor 221 and platform 214 are shown in FIGS. 1, 2, and 19, as located above discharge assembly 13. The motor 221 and platform 214 can be located below the discharge assembly 13. Supports 211 and 212 are secured to the side plates 187 and 192 and extend in a downward direction. The posts 233 and 234 also extend in a downward direction. The chain and sprocket drive 231 can be associated with either end of the shaft 184 depending on the direction of rotation of the motor 221.

Referring to FIGS. 22–25, there is shown a bottom drop assembly indicated generally at 244 useable with the conveyor assembly 10. The bottom drop assembly 244 can be attached to discharge assembly 13 and is operable to selectively allow material to be discharged below the assembly 244.

Figure 21:
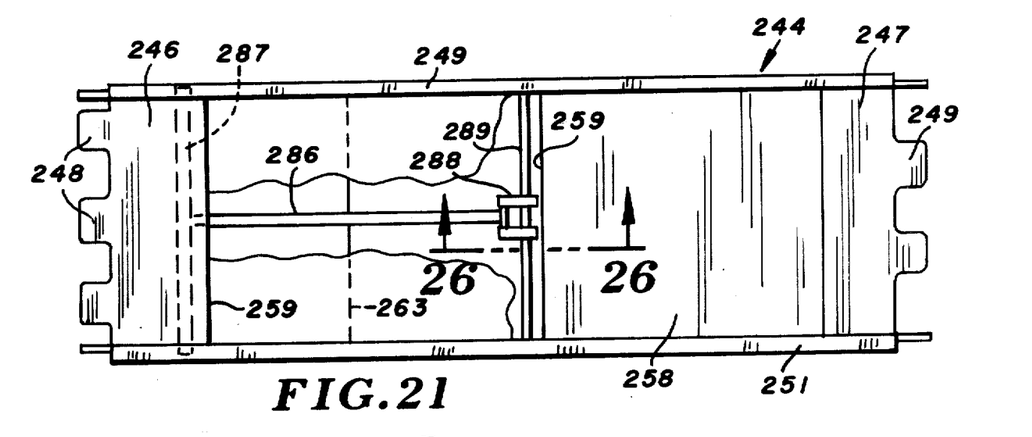
FIG. 21 is a top plan view of a bottom drop assembly useable with the material conveying apparatus of FIG. 1.

Bottom drop assembly 244 has end housing sections 246 and 247. Housing sections 246 and 247 have outwardly directed interlocking spaced tabs 247 and 248, respectively, adapted to be interconnected with complementary tabs of decline assembly 139 and discharge assembly 13.

A pair of upper side walls 249 and 251 and a pair of lower side walls 252 and 253 are connected to the housing sections 248 and 249 with nut and bolt assemblies 256 and 257. The adjacent edges of the upper side walls 249 and 252 and 251 and 253 are spaced from each other with a linear space or slot 254.

Referring to FIG. 21, a transverse floor 258 is located between the side walls 249 and 251. A floor 258 has a generally rectangular opening 259, which is normally closed with a longitudinally movable door 261. Door 261, shown in FIG. 23, rides on the upper edges of the lower side walls 252 and 253 and is movable to a closed position adjacent the bottom of opening 259 and an open position longitudinally spaced from opening 259.

Figure 22:
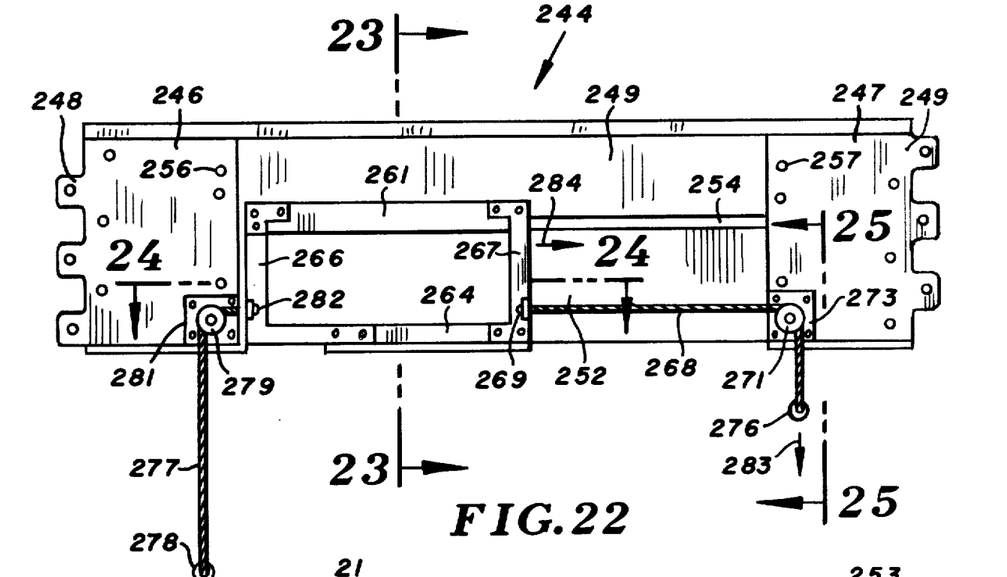
FIG. 22 is a side elevational view of FIG. 21.
Figure 23:
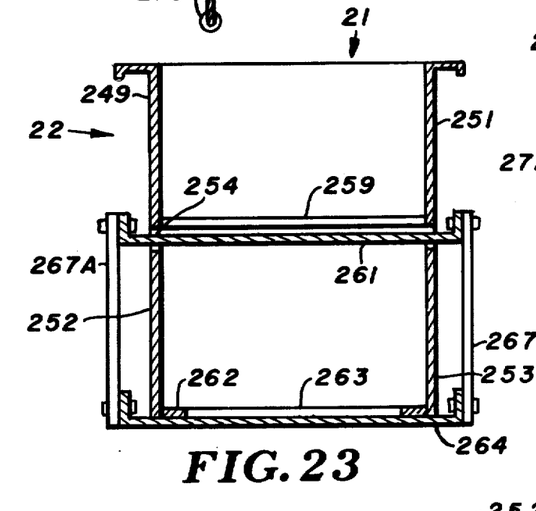
FIG. 23 is a sectional view taken along the line 23—23 of FIG. 22.
Figure 24:
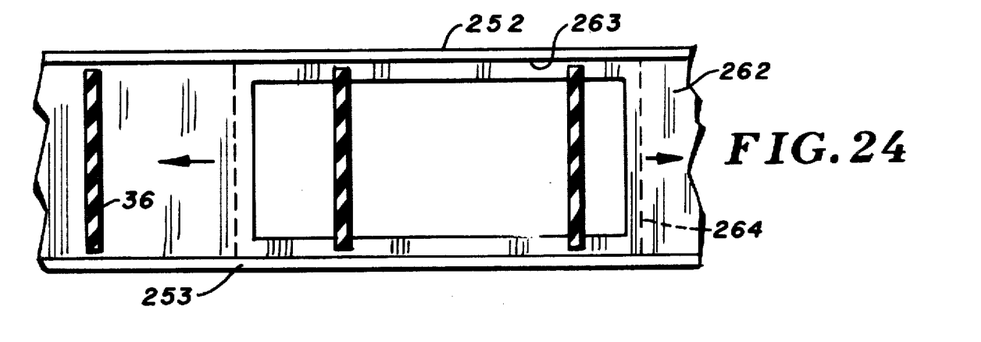
FIG. 24 is a sectional view taken along the line 24—24 of FIG. 22.
Figure 25:
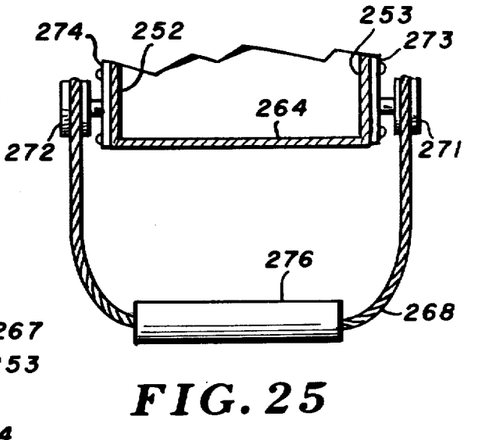
FIG. 25 is a sectional view taken along the line 25—25 of FIG. 22.

The lower side walls 252 and 253 are connected to a generally horizontal bottom wall 262 having a material discharge opening 263 longitudinally offset in a forward direction from opening 259. A movable door 264 is located below opening 263 for closing the opening. As shown in FIG. 22, door 264 is longitudinally spaced or offset from the door 261.

Pairs of connecting arms 266 and 267 connect opposite ends of the doors 261 and 264. The arms 266 and 267 support the bottom door 264 on upper door 261 so that both doors 261 and 264 concurrently move to either open or closed positions.

A first cable 268 is connected with bolts 269 to the arms 267 and 267A. The cable 268 extends to pulleys 271 and 272 rotatably mounted on plates 273 and 374 secured to the sides of housing section 247. The cable 268 loops down from the pulleys 271 and 272 and accommodates a generally horizontal hand gripping tube 276. A second cable 277 is secured to the arms 266 with bolts 281. Cable 277 has a loop accommodating a hand grip tube 278. Cable 277 rides on pulleys 279 attached with plates 281 to the opposite sides of housing section 246.

In use, the doors 261 and 264 are concurrently moved to an open position by pulling down on tube 276, as shown by arrow 283. This moves the doors 261 and 264 in a longitudinal direction, indicated by arrow 284 to the open position. When the doors 261 and 264 are open, the material carried by the upper run of the conveyor 32 is discharged through openings 259 and 263 into a vehicle, conveyor, or similar material handling means located below bottom drop assembly 244.

Figure 26:
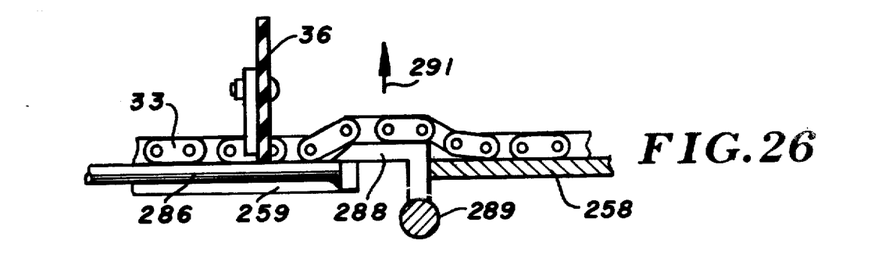
FIG. 26 is a sectional view taken along the line 26—26 of FIG. 21.

Referring to FIGS. 21 and 26, a longitudinal chain support rail or rod 286 is located along the center of the bottom drop assembly 244 for supporting the chain over opening 259. A transverse support rod 287 located below floor 286 is secured to the lower side walls 253 and 254 below the floor 246. Rod 287 is secured to the center of rod 289 and extends in a forward direction to upwardly projected ears 288. Ears 288 are connected to a support transverse rod 289 extended to cam structure (not shown) rotatably mounted in holes in the lower side walls 252 and 253. The cam structure are engagable with door 261 to lower rod 286 and ears 288 to allow the door 261 to close. When door 261 is moved to its open position the cam structure are turned by the door to elevate ears 288 above floor 258. As shown in FIG. 26, ears 288 project upwardly toward floor 258 and provide a bump or projection over which the chain 33 must pass. As the chain moves over ears 288, the chain and paddles 36 move in an upward direction, as indicated by the arrow 291. This provides the chain and paddle with up and down motion, which facilitates the dislodgement of material from the chain 33 and paddles 36 so that the material freely falls through openings 259 and 263.

While there is shown and described an incline-decline conveyor apparatus having a trough assembly and discharge assembly, it is understood that changes in the structures, parts, and arrangement of structures and assemblies may be made by those skilled in the art without departing from the invention. The invention is defined in the following claims.

The embodiments of the invention in which an exclusive property or privilege is claimed are defined as follows:

1. A material conveying apparatus comprising: endless movable conveyor means for moving material, a trough assembly having an open top for receiving material accommodating a section of said conveyor means, tail means connected to the trough assembly having rotatable means engageable with the conveyor means, an incline assembly connected to the trough assembly having upwardly curved guide means for directing the conveyor means in an upward direction, a decline assembly having convex curved means for supporting the conveyor means, housing means connected to the incline and decline assemblies for accommodating a second section of the conveyor means, a material discharge assembly connected to the decline assembly having a material discharge opening and rotatable drive means engageable with the conveyor means, interlocking tab means connecting adjacent assemblies, tail means, and housing means, means mounted on the discharge assembly for rotating the drive means thereby moving the conveyor means to move material from the trough assembly through the incline assembly, housing means, and decline assembly to the discharge assembly whereby material is discharged through said discharge opening, and a bottom drop assembly connected to the decline assembly and discharge assembly, said bottom drop assembly including an elongated housing having a bottom wall and upright side walls attached to the bottom wall, said bottom wall having a first material discharge opening, a floor extended between and attached to the side walls above the bottom wall for supporting the conveyor means, said floor having a second material discharge opening, first door means movably mounted on the side walls for closing the second opening, second door means for closing the first opening, means connecting the first door means and second door means, said first and second door means being movable from a closed position to open position whereby material moved by the conveyor means is discharged through the first and second openings.

2. The apparatus of claim 1 wherein: said tail means has a material clean-out opening and door means for closing said opening.

3. The apparatus of claim 1 wherein: said guide means includes upwardly curved elongated members engageable with the conveyor means.

4. The apparatus of claim 1 wherein: said inclined assembly includes a plurality of side plates and an upwardly curved floor and means connecting the side plates to the floor.

5. The apparatus of claim 4 wherein: said guide means includes upwardly curved elongated members and means mounting the members on the side plates.

6. The apparatus of claim 1 including: plate means located outside of the tab means, and means securing the plate means to the adjacent assemblies, tail means, and housing means.

7. The apparatus of claim 1 wherein: said interlocking tab means include first spaced tabs and second spaced tabs, said first and second tabs offset in an outward direction away from the conveyor means, plate means located in engagement with said tabs, and means securing said plate means to said tabs.

8. The apparatus of claim 1 wherein: the trough assembly, tail means, incline and decline assemblies, housing means, and material discharge assembly each have a generally U-shaped housing and floor means located in said housing supporting said conveyor means.

9. The apparatus of claim 8 wherein: said floor means has side flanges, said side walls having inwardly directed upright tabs engageable with said flanges to mount the floor means on said side walls.

10. The apparatus of claim 9 wherein: said interlocking tab means include first spaced tabs and second spaced tabs, said first and second tabs offset in an outward direction away from the conveyor means, plate means located in engagement with said tabs, and means securing said plate means to said tabs.

11. The apparatus of claim 1 wherein: the means for supporting the conveyor means comprises an elongated convex curved strip.

12. The apparatus of claim 11 wherein: the decline assembly includes a convex curved floor and means securing the strip to the floor.

13. The apparatus of claim 1 wherein: the means mounted on the discharge assembly includes a motor and power transmitting means connecting the motor to the rotatable drive means.

14. The apparatus of claim 13 including: plate means, for supporting the drive means and motor, means mounting the plate means on the discharge assembly, means rotatably mounting the drive means on the plate means, and means connected to the plate means for supporting the motor.

15. The apparatus of claim 14 including: means for adjusting the plate means on the discharge assembly to adjust the tension of the conveyor means.

16. The apparatus of claim 1 wherein: said side walls have longitudinal slots, said first door means extended through said slots and movable in said slots between the open and closed positions thereof.

17. The apparatus of claim 1 wherein: said first opening is longitudinally spaced from the second opening.

18. A material conveying apparatus comprising: endless movable conveyor means for moving material, a trough assembly having an open top for receiving material accommodating a section of said conveyor means, an incline assembly connected to the trough assembly having upwardly curved guide means for directing the conveyor means in an upward direction, floor means located in said trough assembly and incline assembly for supporting the conveyor means, interlocking tab means connecting adjacent ends of the trough assembly and incline assembly together, said tab means including first laterally spaced tabs and second laterally spaced tabs, said first and second tabs being offset in an outward direction away from the conveyor means, plate means located in engagement with said tabs, means securing said plate means to said tabs and trough and incline assemblies, and a material discharge assembly operably connected to the incline assembly having a material discharge opening and rotatable drive means engageable with the conveyor means, and means for rotating the drive means thereby moving the conveyor means to move material from the trough assembly through the incline assembly to the discharge assembly whereby material is discharged through said discharge opening.

19. The apparatus of claim 18 wherein: said guide means includes upwardly curved elongated members engageable with the conveyor means.

20. The apparatus of claim 18 wherein: said incline assembly includes a plurality of side plates, said floor means including an upwardly curved floor, and offset ear means on said side plates connecting the side plates to the floor.

21. The apparatus of claim 20 wherein: said guide means includes upwardly curved elongated members, and means mounting the members on the side plates.

22. The apparatus of claim 18 wherein: the guide means comprises a pair of elongated strips, first means mounting one strip to the side plates on one side of the incline assembly and second means mounting the other strip to the side plates on the other side of the incline assembly.

23. The apparatus of claim 22 wherein: the first means and second means includes a plurality of L-shaped brackets.

24. The apparatus of claim 18 wherein: the means for rotating the drive means is mounted on the discharge assembly and includes a motor and power transmitting means connecting the motor to the rotatable drive means.

25. The apparatus of claim 24 including: Plate means, for supporting the drive means and motor, means mounting the plate means on the discharge assembly, means rotatably mounting the drive means on the plate means, and means connected to the plate means for supporting the motor.

26. The apparatus of claim 25 including: means for adjusting the plate means on the discharge assembly to adjust the tension of the conveyor means.

27. The apparatus of claim 18 including: a decline assembly connected to the incline assembly and discharge assembly, said decline assembly having convex curved means for supporting the conveyor means.

28. The apparatus of claim 27 wherein: said convex curved means includes a longitudinal convex curved strip engageable with the conveyor means.

29. A material conveying apparatus comprising: movable conveyor means for moving material along an elongated path, means for supporting the conveyor means, drive means operably connected to the conveyor means for moving the conveyor means along said path, said means for supporting the conveyor means including an incline, assembly having an upwardly convex curved floor means, a plurality of side plates attached to said floor means, and upwardly convex curved guide means attached to the side plates engageable with the conveyor means for retaining the conveyor means in material conveying relation with said floor means, and a bottom drop assembly for receiving material from the conveyor means, said bottom drop assembly including an elongated housing having a bottom wall, an upright side wall attached to the bottom wall, said bottom wall having a first material discharge opening, a floor extended between and attached to the side walls above the bottom wall for supporting the conveyor means, said floor having a second material discharge opening, first door means movably mounted on the side walls for closing the opening, second door means for closing the first opening, means connecting the first door means and second door means, said first and second door means being movable from closed position to open positions whereby material moved by the conveyor means is discharged through the first and second openings to a selected location.

30. The apparatus of claim 29 including: means connecting the guide means to said side plates to hold said guide means in an upwardly convex curved position.

31. The apparatus of claim 30 wherein: the means connecting the guide means to said side plates includes a plurality of brackets attached to the side plates and guide means.

32. The apparatus of claim 29 wherein: the guide means comprise a plurality of longitudinal strips engageable with the top of the conveyor means.

33. The apparatus of claim 32 including: first means connecting one strip to the side plates on one side of the incline assembly and second means connecting the other strip to the side plates on the other side of the incline assembly.

34. The apparatus of claim 33 wherein: the first means and second means includes a plurality of L-shaped brackets.

35. A material conveying apparatus comprising: movable conveyor means for moving material along an elongated path, a trough assembly having an open top for receiving material accommodating a section of said conveyor means, housing means accommodating the material conveying means for carrying material from the trough assembly to a selected location, interlocking tab means connecting adjacent portion of the trough assembly and housing means together, said tab means including first laterally spaced tabs and second laterally spaced tabs, said first and second tabs being offset in an outward direction away from the conveyor means, plate means located in engagement with said tabs, means securing the plate means to said tabs and trough assembly and housing means, floor means for supporting the conveyor means in said trough assembly and housing means, means connecting the floor means to said trough assembly and housing means, drive means operably connected to the housing means for moving the conveyor means along said path, and a tail assembly connected to the trough assembly having an interior chamber and an opening providing access to the chamber, rotating means located in the chamber engageable with an end of the conveyor means to support the end of the conveyor means, and door means for closing said opening, said door means being movable to an open position whereby material can be removed from the interior chamber.

36. The apparatus of claim 35 wherein: said tail assembly includes a bottom wall having opposite sides and a rear edge, and side walls attached to the opposite sides of the bottom wall, said side walls and rear edge providing an opening to the interior of the tail assembly, said door means being engageable with the side walls and rear edge for closing said opening, and means pivotally mounting the door means on the side walls for movement from the closed position to an open position providing access to the interior of the tail assembly.

37. The apparatus of claim 36 wherein: said side walls have convex curved upper edges, and said door means have convex portions engageable with the convex curved upper edges when the door means is in its closed position.

38. The apparatus of claim 36 wherein: the means pivotally mounting the door means on the side walls comprise arm means secured to the door means extended adjacent the side walls, and pivot means pivotally connecting the arm means to the side walls.

39. The apparatus of claim 36 wherein: the door means includes an upright plate at the upper portion thereof, said means pivotally mounting the door means on the side walls comprising arm means secured to the plate, and pivot means pivotally connecting the arm means to the side walls.

40. The apparatus of claim 39 including: flexible baffle means secured to the plate and extended downwardly from the plate.

41. The apparatus of claim 40 wherein: the baffle means comprises flexible sheet means extended transversely between said side walls when the door means is in the closed position.

42. The apparatus of claim 35 including: flexible baffle means secured to the door means for restricting flow of material to the interior of the tail assembly.

43. The apparatus of claim 42 wherein: the baffle means comprises flexible sheet means extended transversely between said side walls when the door means is in the closed position.

44. A bottom drop assembly for a material conveying apparatus having movable conveyor means comprising: an elongated housing having a bottom wall and upright side walls attached to the bottom wall, said bottom wall having a first material discharge opening, a floor extended between and attached to the side walls above the bottom wall for supporting the conveyor means, said floor having a second material discharge opening, first door means movably mounted on the side walls for closing the second opening, second door means for closing the first opening, means connecting the first door means and second door means, said first and second door means being movable from the closed positions to open positions whereby material moved by the conveyor means is discharged through the first and second openings.

45. The apparatus of claim 44 wherein: said side walls have longitudinal slots, said first door means extended through said slots and movable in said slots between the open and closed positions thereof.

46. The apparatus of claim 44 wherein: said first opening is longitudinally spaced from the second opening.

47. A material conveying apparatus comprising: movable conveyor means for moving material along an elongated path, means for supporting the conveyor means, and drive means operably connected to the conveyor means for moving the conveyor means along said path, said means for supporting the conveyor means including a plurality of end-to-end housing sections, said housing sections having adjacent ends, and interlocking tab means on said adjacent ends securing the adjacent sections together, said interlocking tab means including first laterally spaced tabs on one housing section and second laterally spaced tabs on a housing section located adjacent said one housing section, said first and second tabs being interwoven with each other and offset in an outward direction, plate means located in engagement with said first and second tabs, and means securing said plate means to said tabs and adjacent housing sections.

48. The apparatus of claim 47 wherein: said housing sections are generally U-shaped housings having laterally spaced longitudinal side walls and bottom walls, adjacent side walls and bottom walls having said first and second tabs.

49. The apparatus of claim 48 including: floor means located between said side walls and above the bottom wall for supporting a portion of the conveyor means, and means securing the floor means to said side walls.

50. A material conveying apparatus comprising: movable conveyor means for moving material along an elongated path, means for supporting the conveyor means, and drive means operably connected to the conveyor means for moving the conveyor means along said path, said means for supporting the conveyor means including a bottom drop assembly operable to allow material to be discharged from the conveying apparatus to a selected location, said bottom drop assembly including an elongated housing having a bottom wall and upright side walls attached to the bottom wall, said bottom wall having a first material discharged opening, a floor extended between and attached to the side walls above the bottom wall for supporting a portion the conveyor means, said floor having a second material discharge opening, first door means movably mounted on the side walls for closing the second opening, second door means for closing the first opening, means connecting the first door means and second door means, said first and second door means being movable from closed positions to open positions whereby material moved by the conveyor means is discharged through the first and second openings to said location.

51. The apparatus of claim 50 wherein: said side walls have longitudinal slots, said first door means extended through said slots and movable in said slots between the open and closed positions thereof.

52. The apparatus of claim 51 wherein: said first opening is longitudinally spaced in the direction of movement of the material from the second opening.

53. The apparatus of claim 50 including: means connected to opposite ends of the first and second door means to facilitate movement of said first and second door means between the open and closed positions thereof.

54. The apparatus of claim 50 wherein: the first material discharge opening is longitudinally spaced in the direction of movement of the material from the second opening.

55. The apparatus of claim 50 including: rail means extended longitudinally adjacent said second opening for supporting the conveyor means, and means on the rail means providing the conveyor means with up and down motion to facilitate dislodgement of material from the conveyor means.

56. The apparatus of claim 55 wherein: the means on the rail means comprise upwardly projected ears.

* * * * *